United States Patent Office 3,273,538
Patented Sept. 20, 1966

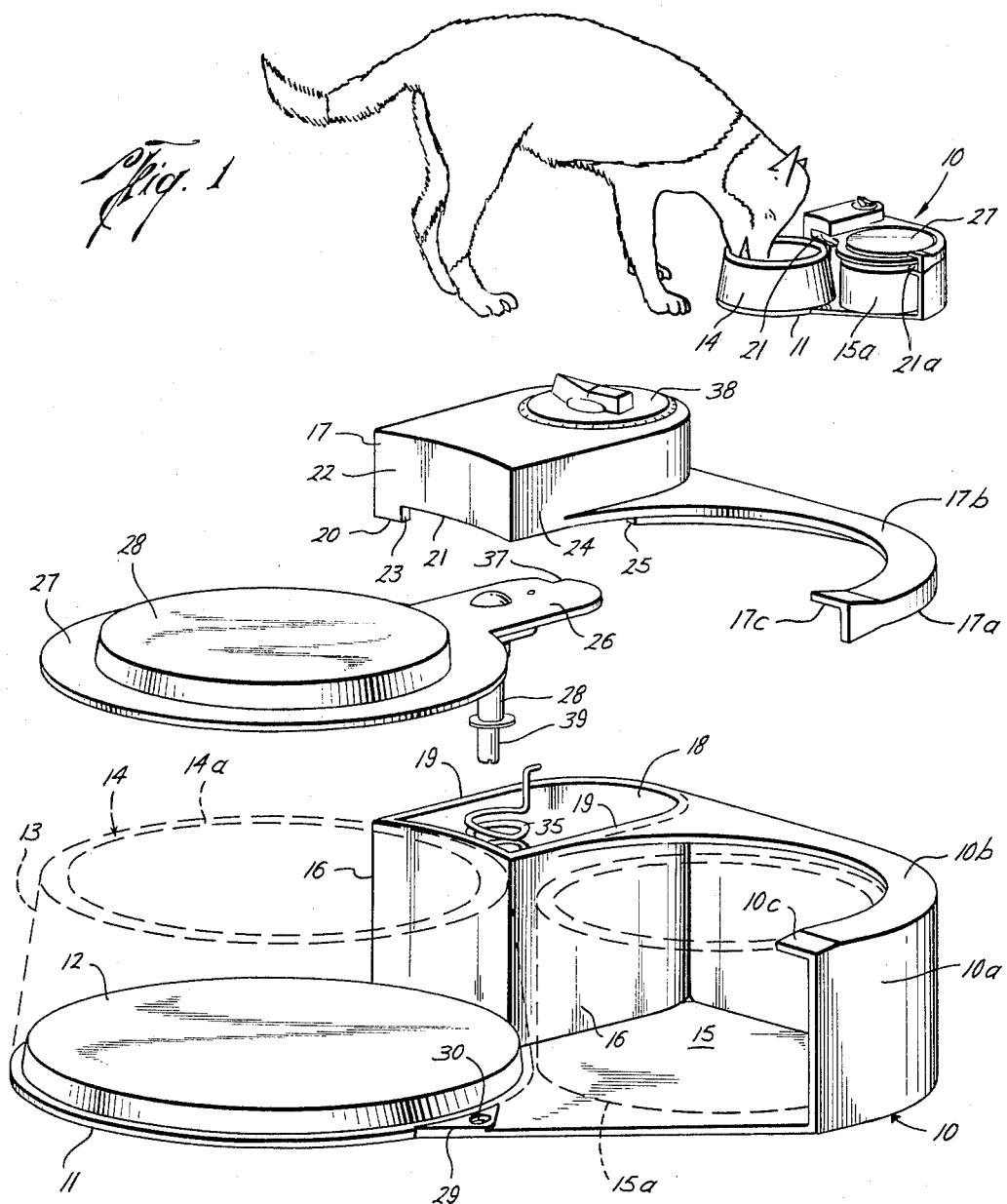

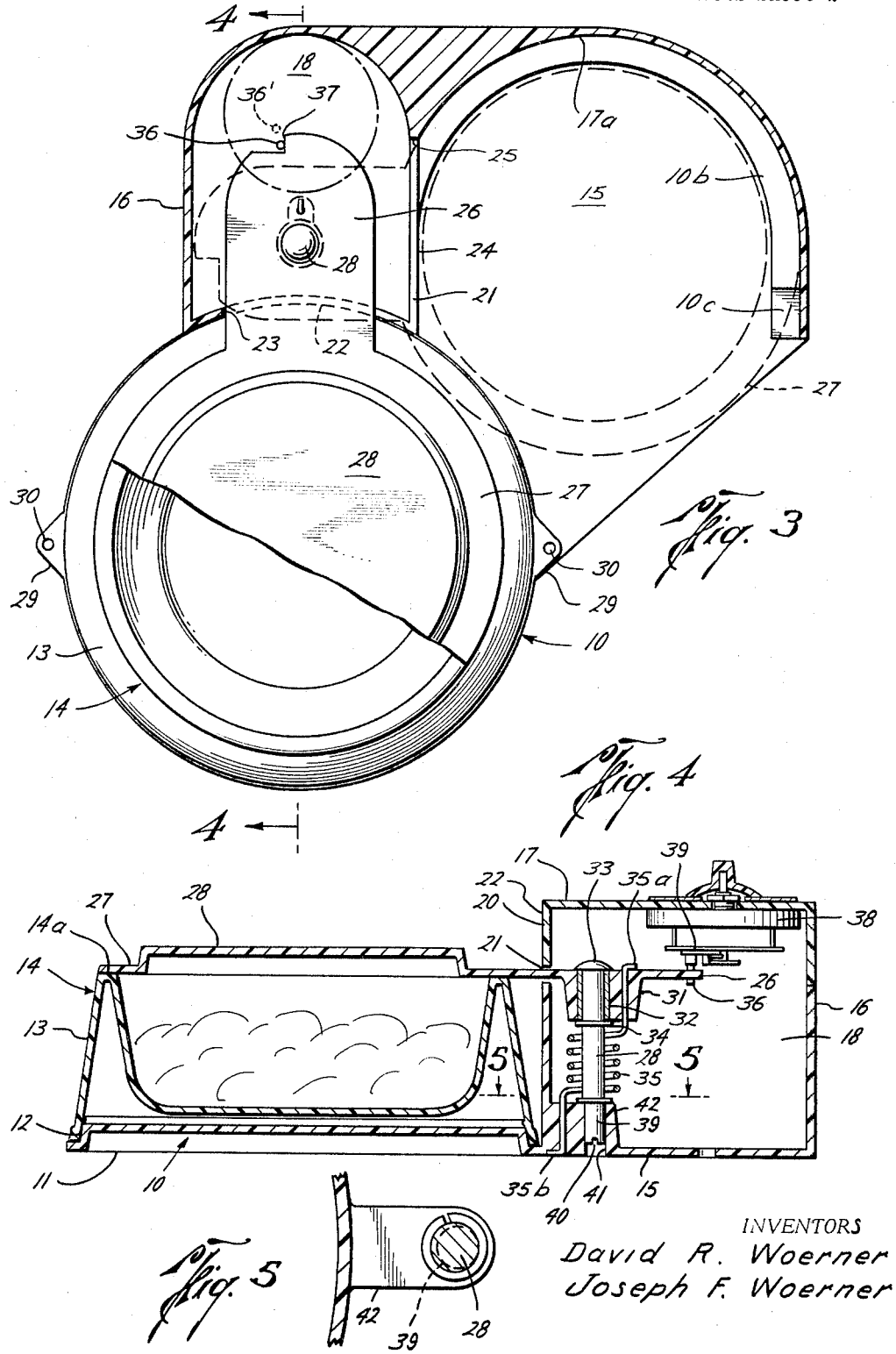

3,273,538
TIME OPERATED ANIMAL FEEDING DEVICE
David R. Woerner and Joseph F. Woerner, both of
823 Azalea St., Houston, Tex.
Filed Mar. 10, 1965, Ser. No. 438,517
8 Claims. (Cl. 119—51.12)

This invention relates to an automatic feeding device for animals and more particularly to an automatic feeding device that uncovers food at the end of a pre-selected interval of time.

In the raising and care of household pets, in commercial animal husbandry, in public parks and zoos, in wildlife reserves, wherever animals are regularly fed, there exists a need for daily attendance. This need becomes hourly in its demand when young growing animals that eat several times a day are involved. Constant attendance can be materially reduced with the use of an automatic feeding device that will uncover previously prepared food at a desired time.

According to the invention, a removable food receptacle or dish is received on the upstanding flange of a base plate. The food is uncovered by a cover plate that is under spring tension to pivot about its rotatable mounting. The cover plate is also held firmly to the top edge of the food receptacle and thereby provides a vermin proof seal. The cover plate is restrained from turning by a timer-controlled release pin. The timer may be preset to a desired interval of time and will release the cover plate through the actuation of the release pin after such time has elapsed.

It is therefore an object of this invention to provide a stationary feeding device of economical design that will automatically uncover previously prepared food at a desired time.

Another object of this invention is to provide an automatic feeding device with a housing for the controlling and functioning parts that prevents their exposure to detrimental corrosive agents.

Another object of this invention is to provide an automatic feeder that is substantially vermin and insect proof to prevent contamination of the food. In compliance with this object the device will, as a natural consequence, be resistant to encroachment on the part of the animal it serves. With these features in mind, certain design aspects of the component parts have been correspondingly treated.

Another object of this invention is to provide an automatic feeding device whose component parts are adjustable in relation to one another so that any minor displacement may be compensated for.

A further object of this invention is to provide an automatic feeder with a removable food receptacle adapted to receive varying amounts of food so that quantity may be controlled for dietary requirements.

A final object of this invention is to provide a support for the cover plate when it is open. The support will also serve to hold a second receptacle to be covered when the first receptacle is uncovered.

For further understanding of this invention and its objects and advantages, reference will be had to the following description and accompanying drawings, and to the claims in which the various novel features of this invention are more particularly set forth.

In the accompanying drawings forming a material part of this disclosure:

FIGURE 1 is a pictorial view of the automatic feeder after operation and in use.

FIGURE 2 is an exploded isometric view of the component parts of the automatic feeder.

FIGURE 3 is a plan view partly in section and partially broken away of the automatic feeder.

FIGURE 4 is a sectional view taken along the line 4—4 of FIGURE 3.

FIGURE 5 is a fragmentary view taken along the line 5—5 of FIGURE 4.

Referring now to the drawings, the numeral 10 represents the stationary housing of an automatic feeder. This stationary housing comprises a base plate 11 generally circular in shape. Raised above and formed as a part of the base plate 11 is a circular flange 12 adapted to receive the side wall 13 of a removable food receptacle 14. A snug fit of the side wall 13 over the flange 12 is desirable. The housing 10 further comprises a base portion 15 radially extending from the base plate 11. The base portion 15 has vertical side walls 16 formed integrally therewith. A cap member 17 is adapted to be a top closure of the cavity 18 formed by the walls 16. It may be secured to the vertical side walls by adhesive or other means when the two parts are ready for assembly.

The vertical side walls 16 are formed with a flat area 19, as best seen in FIGURE 2. The flat area 19 receives downwardly extending walls 20 of the cap 17. The walls 20 do not touch the flat area 19 at all points when the cap 17 is fully down. There is a horizontal slot 21 remaining between the two parts. The flat area 19 lying below said slot is slightly below top periphery 14a of the food receptacle 14. The slot 21 extends along the curved face 22 from the shoulder 23 to the furthest edge there-of and then along the side wall 24 to the shoulder 25. The slot 21 accommodates a radial extension 26 of a circular cover plate 27.

An extension 10a is integrally formed with the side walls 16. Extension 10a has a support shoulder 10b having downwardly sloping entrance pad 10c. The cap member 17 has integrally formed extension 17a adapted to join with the shoulder 10b. Extension 17a has a support shoulder 17b with upwardly sloping entrance pad 17c formed there-on. Shoulder 10b and shoulder 17b together form a support slot 21a to receive the cover plate when it has been rotated to uncover the food receptacle.

Below the support slot 21a a receptacle 15a may rest on a portion of the extension 15. When the cover plate swings to uncover food receptacle 14 and rests in the support slot 21a it is positioned over the receptacle 15a as clearly shown in FIGURE 1. This second dish may be used for food or water. It is, for example, desirable at times to keep an animal from water after they have eaten.

The cover plate 27 is adapted to swing horizontally about the pivot pin 28 from a closed position over the food receptacle 14 to an open or uncovered position as best shown in the broken lines of FIGURE 3. The food receptacle covering portion of the cover plate 27 has a circular bonnet 28 raised above it. The bonnet 28 provides reinforcement to the plate 27. The shape of bonnet 28 and the close fit of plate 27 on the food receptacle 14 will prevent premature forcing of the cover plate off of the receptacle. The design is such that the animal being served will find no place for a purchase with his teeth. The ears 29 with holes 30 on the base plate 11 further prevent tampering by providing a means to secure the assembly.

The radial extension 26 passes through the slot 21 into the cavity 18 and has a boss 31 on its underside. The boss 31 is adapted to snugly receive a bushing 32. The bushing 32 receives pivot pin 28 that is loosely secured between head 33 and snap washer 34 on the pivot pin, to permit rotation of the cover plate about the pin. This rotation is urged by coil spring 35. Coil spring 35 is assembled under tension and fixed between cover plate 27 and housing 10. One end of spring 35 passes up through a hole in the boss 31 and is bent over as at 35a. The other end of spring 35 passes down through a hole in housing 10 and is bent over as at 35b. Spring 35 is under coiled tension when the parts are assembled so that it will torque the cover plate to an open position. It is also stretched upon assembly and the ends 35a and 35b are bent over to maintain the lateral extension thus formed. This acts to pull the cover plate down tightly against the upper peripheral edge of the food receptacle thereby providing a substantially vermin proof seal. The cover plate rests against the top periphery 14a of the food receptacle without touching the bottom edge of the horizontal slot 21. When the cover plate is positioned over the food receptacle it is prevented from swinging off to uncover the food by the timer release pin 36 acting against the shoulder 37. The timer 38, preferably a spring-driven movement of standard design with a trip lever 39, will actuate the release pin 36 to the dotted position 36' of FIGURE 3 after the pre-set interval of time has elapsed; the cover plate 27 will then swing to its open position. One satisfactory timer for such action is manufactured by M. H. Rhodes, Inc., Hartford 6, Connecticut; and is designated by their catalog number 1960.

Pivot pin 28 has a depending extension 39 eccentric to its axis. Extension 39 is equipped with a screw slot 40. Extension 39 fits snugly into hole 41 of boss 42 on base portion 15. By turning the eccentric extension with a screwdriver, the axis of pivot pin 28 will describe a circular path and cause the cover plate 27 to shift in accordance with its movement. This adjustable feature permits the cover plate to be precisely positioned over the receptacle when the release pin 36 is in a restraining position. Allowance can be made for slight misalignment during assembly and for future misalignment due to wear of the co-acting surfaces.

In order to operate the feeder, a desired time for automatic uncovering of the food container is selected. Next the interval of time between loading and the operation is computed and this interval is set into the timer. If, for example, the food dish was prepared at 8:30 a.m. and it was desired to have the food uncovered at 6:00 p.m. of the same day, the nine and one-half hour interval would be used on the timer.

With the food in its receptacle and the cover plate positioned over it, the computed interval is set on the timer. This setting swings the timer release pin 36 against the cover plate shoulder 37, restraining the rotation of the cover plate. When the pre-set interval has expired, the cover plate is released and swings free to uncover the food.

The use of presently available prepared dry food is recommended. This food will not sour during the pre-set interval. If not completely eaten when it is uncovered, dry food will continue to stay fresh and appetizing for long periods.

It has been found that the light ticking sound of the timer has a soothing effect on young animals. When the timer operates and the ticking is discontinued the animals are compensated for this loss by a dish of food and the resulting comfort of a full meal. These features make the device a most acceptable addition to the kennel.

While we have illustrated and described the preferred form of our invention, it is understood that we do not limit ourselves to the precise construction herein disclosed and the right is reserved to all changes and modifications coming within the scope of the invention as defined in the appended claims.

We claim:
1. An automatic feeding device comprising a housing with a base portion having an upstanding flange sized to receive a removable food receptacle, said housing having a compartment with a horizontal opening, a cover plate over said food receptacle, a radial extension of said cover plate adapted to extend through said horizontal opening and into said compartment for mounting said cover plate, means to adjust the alignment of the cover plate when positioned over said food receptacle, means to support the cover plate when not positioned over said food receptacle, means to urge the cover plate into contact with said food receptacle, and means to rotate the cover plate and uncover said food receptacle at the expiration of a pre-selected interval of time.

2. The invention as set forth in claim 1 and further comprising a second removable receptacle covered by said cover plate when said cover plate is not positioned over said food receptacle.

3. An automatic feeding device comprising a housing with a base portion having an upstanding flange sized to receive a removable food receptacle, a food receptacle mounted therein, said housing having a compartment with a horizontal opening, a cover plate over said food receptacle, a radial extension of said cover plate adapted to extend through said horizontal opening for rotatably mounting said cover plate on a pivot pin within said compartment, said pivot pin adapted to adjust the alignment of the cover plate when positioned over said food receptacle, means to support the cover plate when not positioned over said food receptacle, an extended spring secured between said cover plate extension and said housing within said compartment to urge the cover plate into close contact with the aligned periphery of said food receptacle, said spring coiled and assembled to rotate the cover plate and uncover said food receptacle, a timer with a release pin restraining said rotation until the expiration of a pre-selected interval of time.

4. The invention as set forth in claim 3 and further comprising a second removable receptacle positioned under said means to support said cover plate so as to be covered by said cover plate when said cover plate is not positioned over food receptacle.

5. An automatic feeding device comprising a housing with a base portion having an upstanding flange sized to receive a removable food receptacle, said housing having a compartment radially disposed to said base portion, said compartment having a horizontal slot, a circular cover plate over said food receptacle, a raised bonnet portion on said cover plate for its structural support, a radial extension of said cover plate adapted to extend through said horizontal opening for rotatably mounting said cover plate on a vertical pivot pin within said compartment, said vertical pivot pin adapted to adjust the alignment of the cover plate when positioned over said food receptacle, means to support the cover plate when not positioned over said food receptacle, an extended spring secured between said cover plate extension and said housing within said compartment to urge the cover plate into close contact with the aligned periphery of said food receptacle, said spring coiled and assembled about said vertical pivot pin acting to rotate the cover plate and uncover said food receptacle, a timer with a release pin restraining said rotation until the expiration of a pre-selected interval of time.

6. The invention as set forth in claim 5 and further comprising a second removable receptacle positioned under said means to support said cover plate so as to be covered by said cover plate when said cover plate is not positioned over said food receptacle.

7. An automatic feeding device comprising a housing with a base portion having an upstanding circular flange sized to receive a removable food receptacle, said housing having a compartment radially disposed to said base portion, said compartment having a horizontal slot, the lower edge of said horizontal slot slightly below the top periphery of the food receptacle, a circular cover plate over said food receptacle, a raised bonnet portion on said cover plate for its structural support, a radial extension of said cover plate adapted to extend through said horizontal opening for rotatably mounting said cover plate on a vertical pivot pin within said compartment, said vertical pivot pin having an extension eccentric to its axis, means to rotate said extension and adjust the alignment of the cover plate when positioned over said food receptacle, two supporting shoulders formed on said housing having a receiving slot therebetween, said slot adapted to receive and support the cover plate when not positioned over said food receptacle, an extended spring secured between said cover plate extension and said housing within said compartment to urge the cover plate downwardly, the lower edge of said horizontal slot being below the top periphery of said food receptacle such downward force acting to seat said cover plate into close contact with the aligned periphery of said food receptacle, said extended spring coiled and assembled about said vertical pivot pin acting to rotate the cover plate horizontally and uncover said food receptacle, said cover plate extension having a shoulder, a timer with a release pin co-acting with said shoulder to restrain said rotation until the expiration of a preselected interval of time.

8. The invention as set forth in claim 7 and further comprising a second removable receptacle positioned under said two supporting shoulders so as to be covered by said cover plate when said cover plate is not positioned over said food receptacle.

References Cited by the Examiner

UNITED STATES PATENTS

| | | | |
|---|---|---|---|
| 2,752,995 | 7/1956 | Dodge | 119—51.12 |
| 2,791,984 | 5/1957 | Franklin | 119—51.12 |
| 3,137,272 | 6/1964 | Lepper | 119—51.12 |
| 3,180,316 | 4/1965 | Chatfield | 119—51.12 |

SAMUEL KOREN, *Primary Examiner.*

ALDRICH F. MEDBERY, *Examiner.*